United States Patent
Talhami et al.

(10) Patent No.: US 9,491,167 B2
(45) Date of Patent: Nov. 8, 2016

(54) VOICE AUTHENTICATION SYSTEM AND METHOD

(71) Applicant: Auraya Pty Ltd, Dickson (AU)

(72) Inventors: Habib Emile Talhami, Dickson (AU); Amit Sadanand Malegaonkar, Dickson (AU); Renuka Amit Malegaonkar, Dickson (AU); Clive David Summerfield, Dickson (AU)

(73) Assignee: Auraya Pty Ltd, Dickson (AU)

( * ) Notice: Subject to any disclaimer, the term of this patent is extended or adjusted under 35 U.S.C. 154(b) by 0 days.

(21) Appl. No.: 14/427,571

(22) PCT Filed: Sep. 10, 2013

(86) PCT No.: PCT/AU2013/001031
§ 371 (c)(1),
(2) Date: Mar. 11, 2015

(87) PCT Pub. No.: WO2014/040124
PCT Pub. Date: Mar. 20, 2014

(65) Prior Publication Data
US 2015/0249664 A1 Sep. 3, 2015

(30) Foreign Application Priority Data
Sep. 11, 2012 (AU) ............... 2012903952

(51) Int. Cl.
*G06F 15/16* (2006.01)
*H04L 29/06* (2006.01)
(Continued)

(52) U.S. Cl.
CPC ..... *H04L 63/0861* (2013.01); *G06F 17/30743* (2013.01); *G06F 17/30867* (2013.01); *G06F 21/32* (2013.01); *G06N 99/005* (2013.01); *G10L 17/04* (2013.01)

(58) Field of Classification Search
CPC ............... H04L 63/0861; G06F 17/30743; G06F 17/30867; G06F 21/32; G06N 99/005
USPC ........ 713/168–174, 182–186, 202; 709/206, 709/225, 229, 249, 389; 726/2–8
See application file for complete search history.

(56) References Cited

U.S. PATENT DOCUMENTS

| | | |
|---|---|---|
| 2012/0016678 A1 | 1/2012 | Gruber et al. |
| 2012/0219939 A1* | 8/2012 | Aikawa ............ G09B 25/00 434/379 |
| 2013/0225128 A1* | 8/2013 | Gomar ............ H04W 12/06 455/411 |

FOREIGN PATENT DOCUMENTS

WO 2008/089508 A1 7/2008

OTHER PUBLICATIONS

International Search Report, International Patent Application No. PCT/AU2013/001031, dated Dec. 4, 2013, 5 pages.
(Continued)

*Primary Examiner* — Evans Desrosiers
(74) *Attorney, Agent, or Firm* — Fitch, Even, Tabin & Flannery LLP (57) ABSTRACT

A method for maintaining a voiceprint utilizable to authenticate a user comprises associating a trainable universal background model with the user. A voiceprint for the user is generated utilizing the trainable universal background model and at least one enrollment voice sample provided by the user. The trainable universal background model is subsequently trained with additional voice samples provided by the user post enrollment that satisfy predefined adaptation criteria. The voiceprint is regenerated responsive to a change to the trainable universal background model.

11 Claims, 5 Drawing Sheets

(51) Int. Cl.
 *G06F 21/32* (2013.01)
 *G10L 17/04* (2013.01)
 *G06F 17/30* (2006.01)
 *G06N 99/00* (2010.01)

(56) References Cited

OTHER PUBLICATIONS

Written Opinion of the International Search Authority, International Patent Application No. PCT/AU2013/001031, dated Dec. 4, 2013, 6 pages.

Barras, Claude, et al., "Unsupervised Online Adaptation for Speaker Verification Over the Telephone." A Speaker Odyssey, ISCA Tutorial and Research Workshop on speaker and language recognition, Toledo, Spain, Jun. 2004, 4 pages.

Preti, Alexandre, et al., "A Continuous Unsupervised Adaptation Method for Speaker Verification." Innovations in E-learning, Instruction Technology, Assessment and Engineering Education, Springer, 2007, pp. 461-465, 5 pages.

Zang, Wei-Qiang, et al., "Discriminative Universal Background Model Training for Speaker Recognition." Speech and Language Technologies, chapter 12, Jun. 2011, pp. 241-256.

\* cited by examiner

VOICE AUTHENTICATION SYSTEM AND METHOD

FIELD OF THE INVENTION

This invention relates to a voice authentication system and method.

BACKGROUND OF THE INVENTION

Voice authentication systems are becoming increasingly popular for providing secure access control. For example, voice authentication systems are currently being utilised in telephone banking systems, automated proof of identity applications, in call centres systems (e.g. deployed in banking financial services), building and office entry access systems, and the like.

Voice authentication (also commonly referred to as "verification") is typically conducted over a telecommunications network, as a two stage process. The first stage, referred to as the enrolment stage, involves processing a sample of a user's voice by a voice authentication engine to generate an acoustic model or "voiceprint" that represents acoustic parameters unique to that their voice. The second stage, or authentication stage, involves receiving a voice sample of a user to be authenticated (or identified) over the network. Again, the voice authentication engine generates an acoustic model of the sample and compares the resultant parameters with parameters of the stored voiceprint to derive an authentication score indicating how closely matched the two samples are (and therefore the likelihood that the user is, in fact, who they are claiming to be). This score is typically expressed as a numerical value or score and involves various mathematical calculations that can vary from engine to engine.

In the case of the correct, or "legitimate", user accessing the authentication system, the expectation is that their voiceprint (i.e. generated from their voice sample) will closely match the voiceprint previously enrolled for that user, resulting in a high score. If a fraudster (often referred to in the art as an "impostor") is attempting to access the system using the legitimate user's information (e.g. voicing their password, etc.), the expectation is that the impostor's voiceprint will not closely match the legitimate person's enrolled voiceprint, thus resulting in a low score even though the impostor is quoting the correct information.

It is not uncommon for important acoustic characteristics of a user's enrolment sample (i.e. used to generate their voiceprint) to vary considerably from the sample subsequently provided for authentication purposes. For example, the acoustic environment when making the authentication call may be quite different to that when they initially enrolled with the system, thus resulting in a mismatch in acoustic parameters that are evaluated by the authentication engine. Other acoustic characteristic that may also vary considerably include the channel type (e.g. whether the call is made over a mobile phone network, public-switched network, IP based network or a combination thereof). Such mismatches can lead to a significant increase in both false rejection and acceptance errors being made by the authentication system.

SUMMARY OF THE INVENTION

In accordance with a first aspect of the present invention there is provided a method for maintaining a voiceprint utilisable to authenticate a user, the method comprising:

associating a trainable universal background model with the user;

generating a voiceprint for the user utilising the trainable universal background model and at least one enrolment voice sample provided by the user;

training the trainable universal background model with additional voice samples provided by the user post enrolment that satisfy predefined adaptation criteria; and re-generating the voiceprint responsive to a change to the trainable universal background model.

In an embodiment the trainable universal background model initially associated with the user corresponds to a seed universal background model which is built from voice samples provided by a cohort of speakers with one or more shared voice characteristics.

In an embodiment the trainable universal background model is only trained with additional voice samples provided by the user.

In an embodiment the additional voice samples are provided by the user as part of one or more authentication determinations which reference the voiceprint.

In an embodiment the training step is carried out dynamically as new voice samples are provided for authentication.

In an embodiment one of the adaptation criteria requires that the additional voice samples resulted in a successful authentication of the user.

In an embodiment a further adaptation criterion is that the additional voice samples satisfy an audio quality criterion.

In an embodiment the audio quality criterion is that an individual equal error rate for the additional voice samples is less than a predefined threshold.

In an embodiment the method further comprises continuing to train the trainable universal background model with additional voice samples until a quality measure for at least one of the trainable universal background model and voiceprint has been met.

In accordance with a second aspect of the present invention there is provided a voice authentication system comprising:

a processing module operable to generate a voiceprint for a user, utilising a trainable universal background model stored in association with the user and at least one enrolment voice sample provided by the user;

a biometric trainer operable to train the trainable universal background model with an additional voice sample provided by the user post enrolment that satisfies predefined adaptation criteria, such that the processing module is further operable to regenerate the voiceprint responsive to a change to the trainable universal background model.

In an embodiment the voiceprint is regenerated utilising the additional voice sample.

In an embodiment the trainable universal background model initially associated with the user corresponds to a seed universal background model which is built from voice samples provided by a cohort of speakers with one or more shared voice characteristics.

In an embodiment the trainable universal background model is dynamically trained with a plurality of voice samples provided by the user in one or more authentication sessions that reference the voiceprint.

In an embodiment one of the adaptation criteria requires that the additional voice samples resulted in a successful authentication of the user.

In an embodiment a further adaptation criterion is that the additional voice samples satisfy an audio quality criterion.

In an embodiment the audio quality criterion is that an individual equal error rate for the additional voice samples is less than a predefined threshold.

In an embodiment the training module is operable to continue to train the trainable universal background model with additional samples until a quality measure for at least one of the trainable universal background model and voiceprint has been met.

In accordance with a third aspect of the present invention there is provided a voice authentication method, comprising utilising a voice sample provided by a user during an authentication session to dynamically train a universal background model associated with that user, such that the trained universal background model and voice sample provided for authentication are in turn utilised to regenerate a user voiceprint for use in subsequent authentication sessions.

In accordance with a fourth aspect of the present invention there is provided computer program code comprising at least one instruction which, when executed by a computer, is arranged to implement the method as described in accordance with the first and third aspects.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION OF PREFERRED EMBODIMENTS

Embodiments relate to techniques for actively learning speaker habits, communication modes and acoustic environments for a user enrolled with an authentication system to reduce the number of false rejection and false acceptance errors when making authentication determinations for that user. The active learning techniques advantageously utilise a personalised UBM (referred to herein as a trainable UBM) for voiceprint generation, which is dynamically trained over time using authenticated voice samples that meet various quality criterion.

In the context of the present specification, the term "seed universal background model" (UBM) will be understood as being related to a speaker-independent Gaussian Mixture Model (GMM) trained with speech samples from a cohort of speakers having one or more shared speech characteristics.

For the purposes of illustration, and with reference to the figures, embodiments of the invention will hereafter be described in the context of a voice processing system 102 which provides voice authentication determinations for a secure service 104, such as an interactive voice response ("IVR") telephone banking service. In the illustrated embodiment, the voice processing system 102 is implemented independently of the secure service 104 (e.g. by a third party provider). In this embodiment, users (i.e. customers of the secure service) communicate with the secure service 104 using an input device in the form of a telephone 106 (e.g. a standard telephone, mobile telephone or IP telephone service such as Skype).

Figure 1:
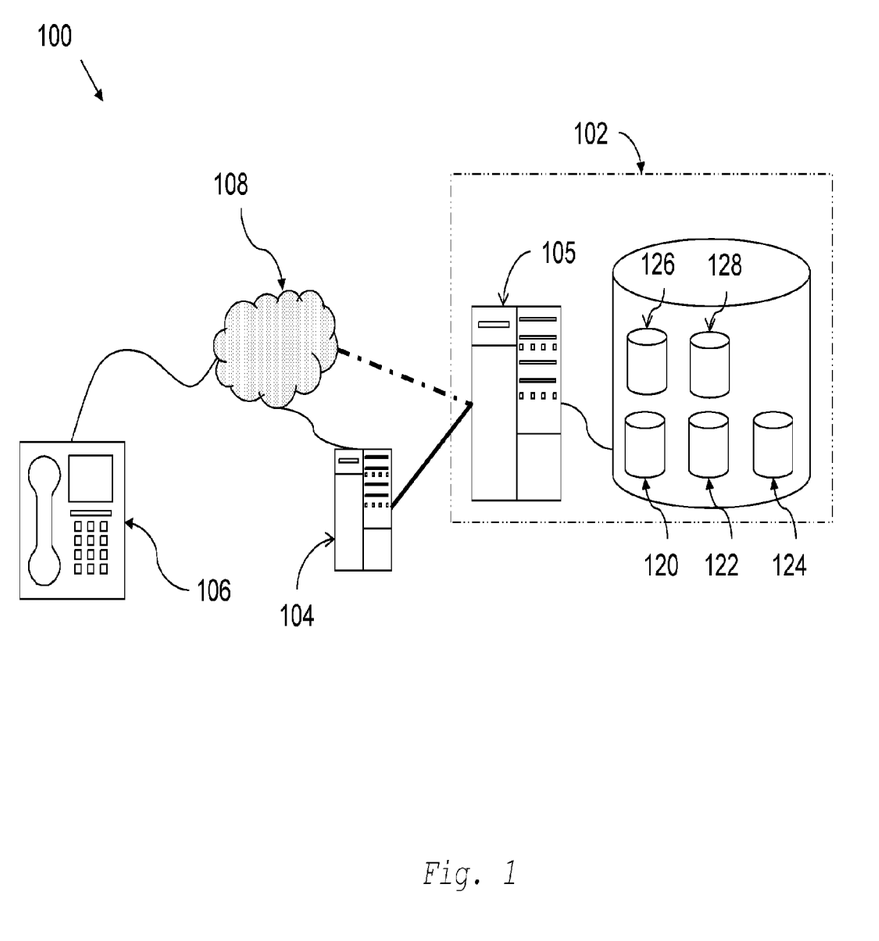
FIG. 1 is a block diagram of a system in accordance with an embodiment of the present invention.

FIG. 1 illustrates an example system configuration 100 for implementing an embodiment of the present invention. As discussed above, users communicate with the telephone banking service 104 using a telephone 106. The secure service 104 is in turn connected to the voice processing system 102 which is operable to authenticate the users before they are granted access to the IVR banking service. According to the illustrated embodiment, the voice processing system 102 is connected to the secure service 104 over a communications network in the form of a public-switched telephone network 108.

Further Detail of System Configuration—

Figure 2:
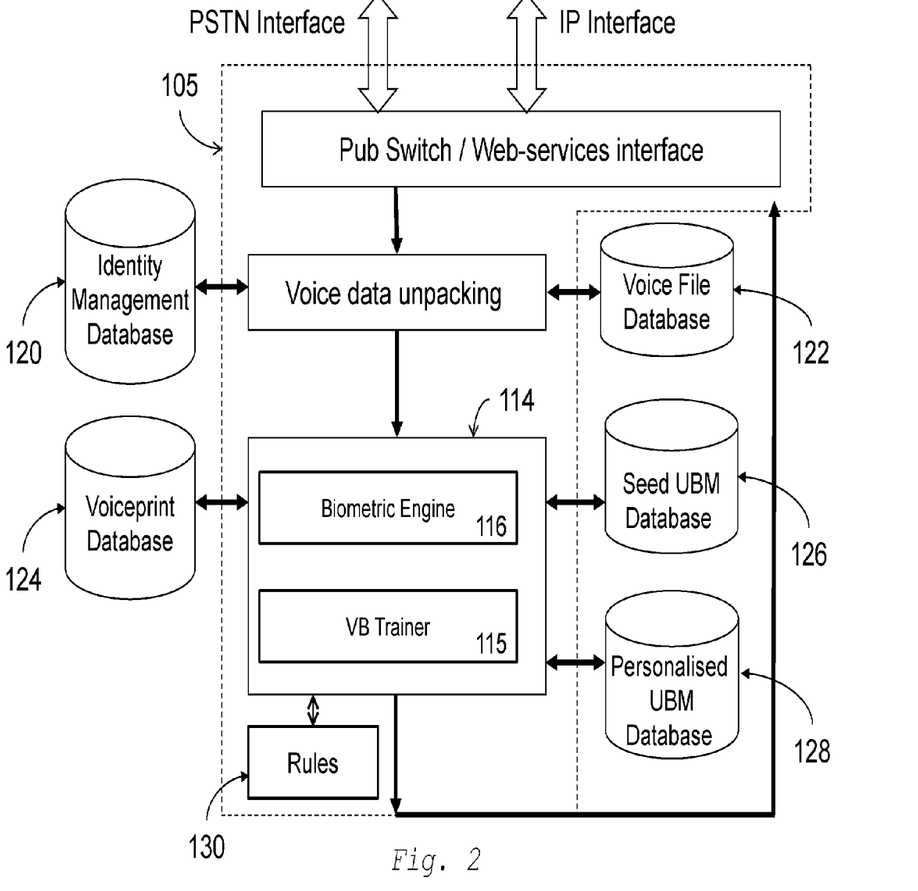
FIG. 2 is a schematic of the individual modules implemented by the voice processing system of FIG. 1.

With reference to FIG. 2, the voice processing system 102 comprises a server computer 105 which includes typical server hardware including a processor, motherboard, random access memory, hard disk and a power supply. The server 105 also includes an operating system which co-operates with the hardware to provide an environment in which software applications can be executed. In this regard, the hard disk of the server 105 is loaded with a processing module 114 which, under the control of the processor, is operable to implement various voice authentication and training functions, as will be described in more detail in subsequent paragraphs. As illustrated, the processing module 114 comprises two specific modules/components for carrying out the afore-described functions, namely a voice biometric trainer 115 and voice biometric engine 116.

The processing module 114 is communicatively coupled to a number of databases including an identity management database 120, voice file database 122, voiceprint database 124, seed UBM database 126 and personalised UBM database 128. A rule store 130 is provided for storing various training rules implemented by the processing module 114, again as will be described in more detail in subsequent paragraphs.

The server 105 includes appropriate software and hardware for communicating with the secure service provider system 104. The communication may be made over any suitable communications link, such as an Internet connection, a wireless data connection or public network connection. In an embodiment, the user voice data (i.e. the speech samples provide by users during enrolment, authentication and subsequent interaction with the secure service banking system) is routed through the secure service provider 104. Alternatively, the voice data may be provided directly to the server 105 (in which case the server 105 would also implement a suitable call answering service).

As discussed, the communication system 108 of the illustrated embodiment is in the form of a public switched telephone network. However, in alternative embodiments the communications network may be a data network, such as the Internet. In such an embodiment users may use a networked computing device to exchange data (in an embodiment, XML code and packetised voice messages) with the server 105 using a network protocol, such as the TCP/IP protocol. Further details of such an embodiment are outlined in the published international patent application PCT/AU2008/000070, the contents of which are incorporated herein by reference. In another alternative embodiment, the communication system may additionally comprise a third or fourth generation ("3G"), CDMA or GPRS enabled mobile telephone network connected to the packet-switched network, which can be utilised to access the server 105. In such an embodiment, the user input device 106 includes wireless capabilities for transmitting the speech samples as data. The wireless computing devices may include, for example, mobile phones, personal computers having wireless cards and any other mobile communication device which facilitates voice recordal functionality. In another embodiment, the present invention may employ an 802.11 based wireless network or some other personal virtual network.

According to the illustrated embodiment the secure service provider system 104 is in the form of a telephone banking server. The secure service provider system 104 comprises a transceiver including a network card for communicating with the processing system 102. The server also includes appropriate hardware and/or software for providing an answering service. In the illustrated embodiment, the secure service provider 104 communicates with the users over a public-switched telephone network 108 utilising the transceiver module.

Voiceprint Enrolment/Generation—

Figure 3:
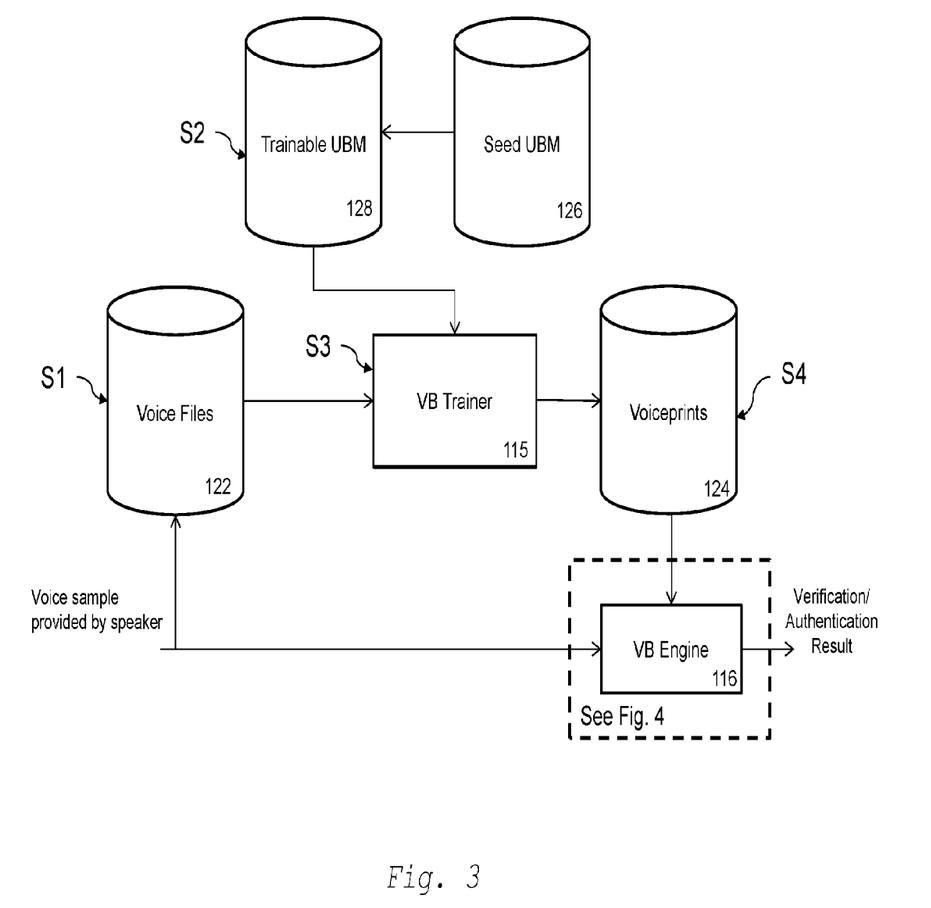
FIG. 3 is a schematic illustrating a process flow for creating voiceprints.

Before describing techniques for UBM training, a basic process flow for enrolling voice samples so as to generate a user's initial voiceprint will be described with reference to FIG. 3.

At step S1 an enrolment speech sample for a user is received by the system 102 and stored in the voice file database 122 in a suitable file storage format (e.g. a wav file format). The stored voice file is indexed in association with the user identity stored in the identity management database 120. Verification samples provided by the user during the authentication process (which may, for example, be a passphrase, account number, etc.) are also stored in the voice file database 122.

At step S2 a seed UBM is selected from the seed UBM database 126. According to the illustrated embodiment, the seed UBM database 126 stores a plurality of different seed UBMs (with each seed UBM having been trained from a cohort of speakers that share one or more particular speech characteristics, such as language, accent, sex, etc.). Thus, the selection of seed UBM for the user being enrolled with the system 102 involves selecting a seed UBM that best matches the particular acoustic characteristics of the user. For example, where the user is a European male the system may select a seed UBM which has been built from a population of European male speakers. The system may determine an acoustic characteristic of the user by way of an evaluation of the enrolled sample (which involves acoustically processing the sample using techniques understood by persons skilled in the art). It will be understood that any number of different seed UBMs may be selectable, depending only on the desired implementation.

The selected seed UBM is stored in the personalised UBM database 128, in association with the user identify. Hereafter, the UBM stored in the personalised UBM database 128 is referred to as a "trainable UBM", for reasons which will become evident in subsequent paragraphs.

At step S3 the voice biometric trainer 115 processes the stored voice file and the trainable UBM (which at this point mirrors the selected seed UBM) in order to generate a voiceprint for the user, using techniques well understood by persons skilled in the art. It will be understood that the system 102 may request and process additional enrolment speech samples until a sufficient number of samples have been process to generate an accurate voice print.

At step S4 the voiceprint is loaded into the voiceprint database 124 for subsequent use by the voice biometric engine 116 during a user authentication process (step S5).

It will be understood that steps S1 through S4 are repeated for each new user enrolling with the system 102.

Authentication—

Figure 4:
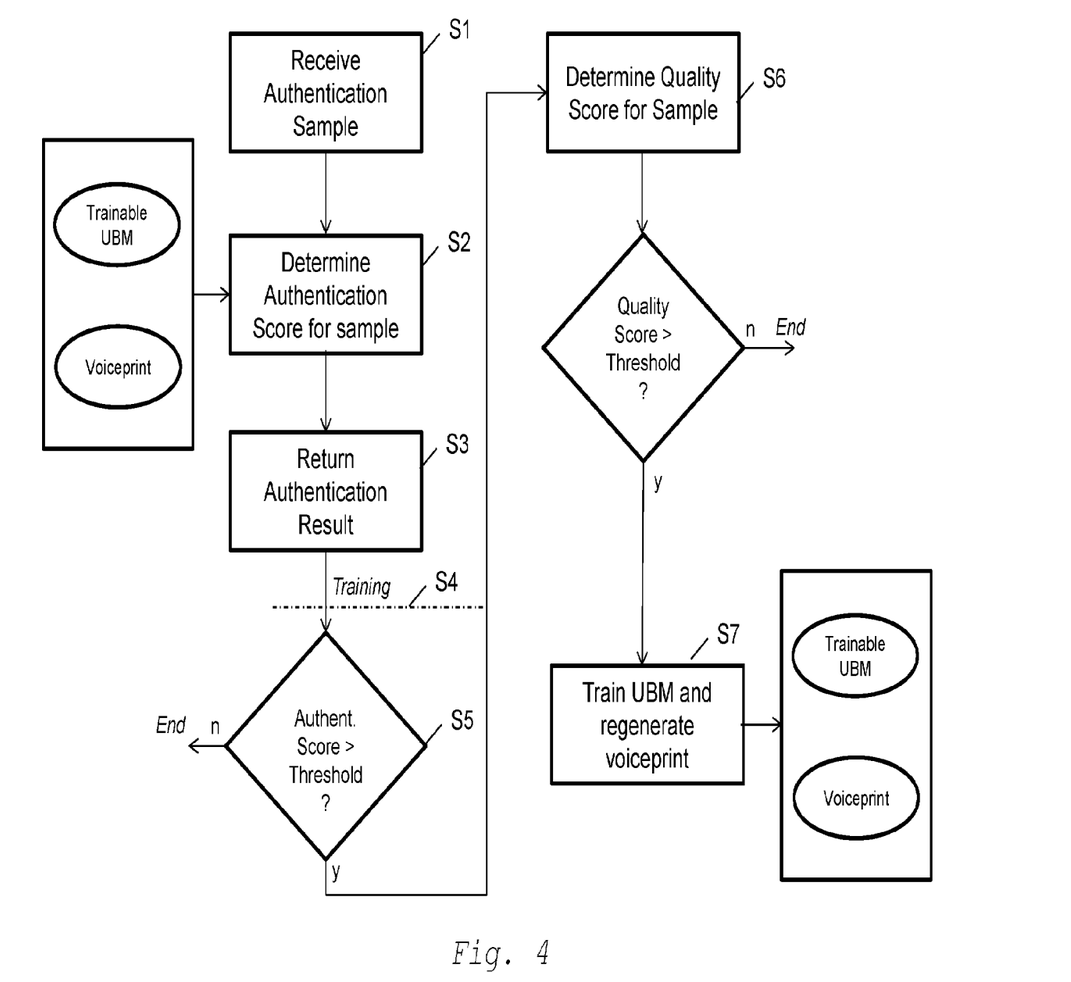
FIG. 4 is a schematic illustrating a process flow for authentication and training, in accordance with an embodiment of the invention.

With reference to FIG. 4, there is shown a process flow for authenticating (i.e. verifying the identity of) a user attempting to access the secure service 104.

At step S1 a voice sample to be authenticated is saved as a voice file and presented to the voice biometric engine 116. Once received, at step S2, the voice biometric engine 116 processes the voice file so as to output an authentication score. According to one example implementation, the basic process for generating an authentication score comprises performing an acoustic analysis of the voice file to produce a sequence of acoustic vectors representing the relevant voice characteristics for statistical analysis and comparison. Statistical pattern matching algorithms operating in the biometric engine 116 compare the sequence of acoustic vectors with the voiceprint of the legitimate user to generate a probability score representing how well the voice signal matches the voiceprint for the claimed user (i.e. an indication of the likelihood that the user providing both samples is one and the same). Such pattern matching algorithms may include dynamic time warping (DTW), the hidden Markov model (HMM), among others. Further, the algorithms operating in the biometric engine 116 also compare the acoustic vector sequence with the trainable UBM stored in the personalised UBM database 128 in association with the legitimate user, to provide a reference score against which to calibrate the probability scores generated by the user voiceprint. The resultant calibrated probability scores thus provide a measure of how closely matched the voice file is to the user voiceprint. The resultant score is provided to the secure service 104 for determining whether to grant the user access to the requested service (step S3).

UBM Training and Voiceprint Re-Generation—

As previously mentioned, the system 102 may be configured to process voice files stored for authentication to actively learn and adapt to speaker habits, channel variations (e.g. whether the voice sample is being provided over an IP network, mobile phone network, etc.), as well as variations relating to the different acoustic environments for the user when accessing the system. In a particular embodiment, this involves training the trainable UBM and voiceprint using the authenticated voice files, which may in turn significantly reduce the false rejection and acceptance errors as will now be described in more detail.

Still with reference to FIG. 4, at step S4 the authentication score output by the biometric engine 116 is passed to the voice biometric trainer 115 which then evaluates a number of rules (stored in the rules store 130) to determine whether or not to train the trainable UBM with the authenticated voice file. In a particular embodiment, a first of the rules involves determining whether the authentication score is greater than some predefined threshold score (step S5). The threshold score may, for example, correspond to the individual equal error rate "IEER" (discussed in more detail in subsequent paragraphs). If the authentication score is less than the predefined threshold, then the voice file is not considered to be ideal for training the trainable UBM and the process ends. If the authentication score meets or exceeds the threshold, then the process moves to step S6.

At step S6, the biometric training module 115 determines whether the audio in the voice file is of sufficient quality for training the UBM. If the audio is of sufficient quality the process moves to step S7, otherwise the voice file is not considered to be ideal for training the trainable UBM and the process ends.

According to a particular example embodiment, the step of determining whether the audio is of sufficient quality involves evaluating the individual equal error rate for the voiceprint of the user, utilising the voice sample provided for authentication. The equal error rate for the voiceprint (hereafter the individual equal error rate "IEER") may be calculated as follows. First, the voiceprint is tested with multiple voice samples provided by other users (referred to as 'impostor samples') to generate a false acceptance characteristic for that customer's voiceprint. The impostor samples may be obtained from other user profiles, or an external database storing a set of impostor voice files (i.e. stored impostor voice samples) suitable for testing. The false acceptance characteristic is in turn used to compute the false acceptance rate for that voiceprint (hereafter referred to as the individual false acceptance rate "IFAR"). Next, the false rejection rate for the voiceprint (hereafter the individual false rejection rate, or "IFRR") is determined by testing the voiceprint with the authenticated voice file. The IFAR and IFRR scores are subsequently processed to determine the IEER for the voiceprint. The IEER is determined where the IFAR and IFRR characteristics intersect, essentially where the IFRR=IFAR. A small IEER signifies that the audio quality is good. In a particular embodiment, the IEER may be compared against some threshold EER such that if the IEER is less than the threshold EER then the voice file will be used for updating the trainable UBM. The threshold EER may, for example, be derived by doing offline testing with utterances that are known to be self-utterances (i.e. good quality utterances) and utterances that are known to be imposter utterances (i.e. bad quality utterances). Given the scores for these known utterances the threshold is determined by finding the intersection between the false acceptance and the false rejection curves. That point of intersection is also the equal error rate point for the offline utterance quality calibration process.

At step S7, the trainable UBM is trained using the authenticated voice file (i.e. which has passed both the threshold score and audio quality tests). The training process will now be described in detail with additional reference to FIG. 5.

Figure 5:
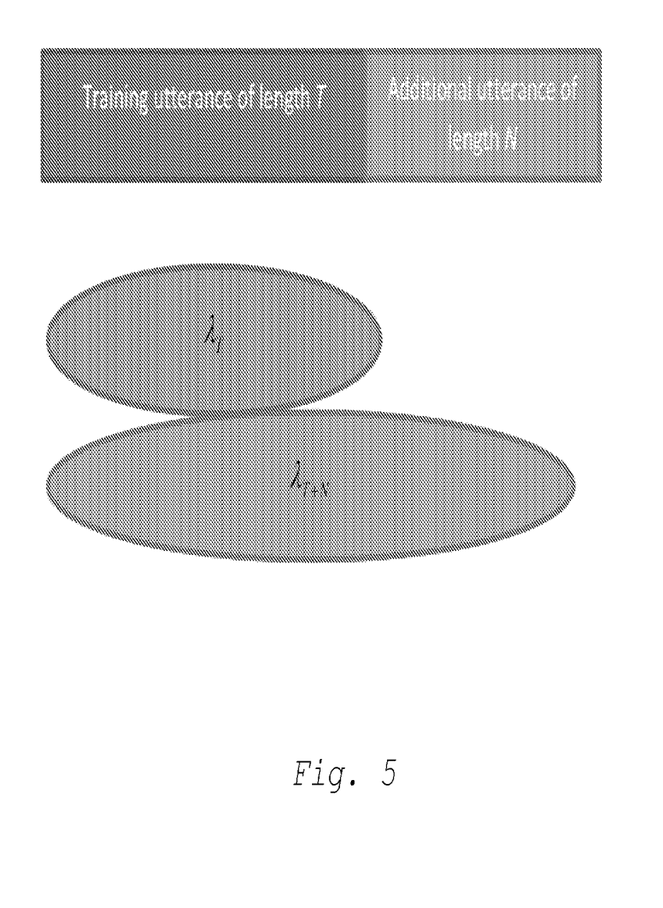
FIG. 5 is a block diagram illustrating training of a UBM, in accordance with an embodiment.

Consider the seed UBM (in this case being in the form of a Gaussian Mixture Model (GMM)), $\lambda_T$, trained on a set of feature vectors of length T derived from audio captured from a set of speakers.

Given the additional sample of length N and the seed UBM $\lambda_T$, the new trainable UBM is estimated by updating the means of the UBM $\lambda_{T+N}$ (where T+N, indicates an addition of segment N to segment T).

With reference to equation (1) below, a standard Maximum A-Posteriori (MAP) equation may be used for UBM adaptation of the mean of a seed UBM for mixture m denoted as $\mu_m$ $$\bar{\mu}_m^{\lambda_{T+N}} = \frac{E_m^{0 \to T+N} + R\mu_m}{\eta_m^{0 \to T+N} + R} \quad (1)$$

Where, $\bar{\mu}_m^{\lambda_{T+N}}$ is the new mean of the trainable UBM, $\{E_m^{0 \to T+N}, \eta_m^{0 \to T+N}\}$ are the sufficient statistics for mean and the weights of mixture m, computed using data T+N, while R is a fixed constant known as the relevance factor.

Equation (1) may thus be re-written as:

$$\bar{\mu}_m^{\lambda_{T+N}} = \frac{E_m^{0 \to T} + E_m^{(T+1) \to N} + R\mu_m}{\eta_m^{0 \to T} + \eta_m^{(T+1) \to N} + R} \quad (2)$$

$\eta_m^{x \to y}$ is the sufficient statistic of weight of mixture m, computed for a data segment of length x to y. It can be seen that if $E_m^{0 \to T}$ and $\eta_m^{0 \to T}$ are stored while training $\lambda_T$, then the means of $\lambda_{T+i}$ can readily be obtained by estimating $\{E_m^{(T+1) \to N}, \eta_m^{(T+1) \to N}\}$ from the segment i. In other words, upon the capture of a new sample (i.e. authenticated voice file), the new mean of the trainable UBM is derived from the previous mean (initially the seed UBM) by using the statistics of the previous segment(s) (initially the audio segments used to train the seed UBM) and the statistics of the current segment (the newly captured sample).

With reference back to FIG. 4, once the trainable UBM has been trained with the authenticated voice file, a new voiceprint is generated using the same process as previously described with reference to FIG. 3, though this time utilising the additional authenticated voice file and with reference to the newly trained UBM.

According to the illustrated embodiment, as new voice files for a user are stored in the voice file database 122 for authentication, they are automatically forwarded to the biometric trainer 115 for actively training the associated UBM and re-generating the voiceprint (i.e. provided the predefined training criteria have been met). It will be appreciated that over time, the trainable UBM and voiceprint will be sufficiently aligned to the user's speech habits, channel types and environment types, such that the training process can be halted to save on processing power. The determination as to whether the UBM and voiceprint are sufficiently aligned may involve, for example, comparing the IEER against some predefined system threshold level such that when the speaker EER travels beyond that level the training process is stopped (to prevent the voiceprint from exceeding the predefined EER level). If the voiceprint does happen to exceed the predefined EER the respective UBM and voiceprint may be reverted to their previous state (thus ensuring optimal performance).

It will be appreciated that the additional samples used to train the trainable UBM may not only be obtained from samples provided as part of the authentication process, but may also be samples of commands issued by the user during a subsequent secure service session (in this case, being a telephone banking session).

Although embodiments described in preceding paragraphs described the processing system 102 in the form of a "third party", or centralised system, it will be understood that the system 102 may instead be integrated into the secure service provider system 104.

Alternative configuration and methodology may include the collection of speech samples by speakers using third party speech recognition function such as the "Siri" personal assistant (as described in the published United States patent application no. 20120016678 assigned to Apple Inc.), or "Dragon" speech recognition software (available from Nuance Communications, Inc. of Burlington, Mass.) integrated into a smart phone or other computing device which is used in conjunction with a voice authentication system as described herein. In this case the speech samples from the "known" speaker can be stored in the voice file database 122 for use in training the UBM (and re-generating the voiceprint) as described herein. Alternatively, speech samples collected by a host or cloud service, such as a hosted IVR service or a cloud based voice processing system, used in conjunction with a voice authentication system, could also be used for this purpose.

A number of advantages arise through implementation of embodiments described herein, including:

- A trainable or "personalised" UBM stored in association with a particular user is able to adaptively learn new utterances (i.e. samples) provided by the user post enrolment with the authentication system. The UBM may thus be trained to adapt to variations in speaker habits, channel types and environments for providing greater authentication accuracy than for a conventional speaker-independent UBM arrangement.
- Authentication using the trainable UBM will work straight out of the box, and can be enhanced over time without requiring any system downtime to update models. In other words, there is no need to perform offline tuning or optimisation since this is done dynamically as new authentication samples are received by the system.
- Voice data can be kept in the one location improving the integrity of the data
- The training process can be halted at any time for individual users (or on a system level) once a performance threshold has been reached to save on processing power.

While the invention has been described with reference to the present embodiment, it will be understood by those skilled in the art that alterations, changes and improvements may be made and equivalents may be substituted for the elements thereof and steps thereof without departing from the scope of the invention. In addition, many modifications may be made to adapt the invention to a particular situation or material to the teachings of the invention without departing from the central scope thereof. Such alterations, changes, modifications and improvements, though not expressly described above, are nevertheless intended and implied to be within the scope and spirit of the invention. Therefore, it is intended that the invention not be limited to the particular embodiment described herein and will include all embodiments falling within the scope of the independent claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method for maintaining a voiceprint utilisable to authenticate a user, the method comprising:
   selecting a universal background model that matches one or more acoustic parameters determined for the user and storing the selected universal background model in a database in association with a user profile for subsequent personalisation thereof;
   generating a voiceprint for the user utilising the stored universal background model associated with the user and at least one enrolment voice sample provided by the user;
   training the stored universal background model with additional voice samples provided by the user post enrolment that satisfy predefined adaptation criteria, wherein a first of the adaptation criteria comprises that the additional voice samples have been authenticated during a post enrolment authentication process referencing the user's voiceprint such that, once associated with the user, the stored universal background model is only trained with additional authenticated voice samples provided by the user so as to exclusively personalise the stored universal background model to the user and wherein a second of the adaptation criteria comprises that the additional voice samples meet a predefined quality measure; and
   re-generating the voiceprint responsive to a change to the stored universal background model.

2. A method in accordance with claim 1, wherein the initially selected universal background model corresponds to a seed universal background model which is built from voice samples provided by a cohort of speakers with one or more acoustic parameters shared by the user.

3. A method in accordance with claim 1, wherein the training step is carried out dynamically as new voice samples are provided for authentication.

4. A method in accordance with claim 1, wherein the quality measure of the second adaptation criteria is met when an individual equal error rate for the additional voice samples is less than a predefined threshold.

5. A method in accordance with claim 1, further comprising continuing to train the stored universal background model with additional voice samples until a quality measure for at least one of the stored universal background model and voiceprint has been met.

6. A voice authentication system comprising:
   a processor coupled to a memory operable to generate a voiceprint for a user, utilising a stored universal background model associated with the user and at least one enrolment voice sample provided by the user, the universal background model being initially selected from a set of different universal background models based on one or more acoustic parameters determined for the user and wherein the selected universal background model is subsequently stored in a database in association with a user profile for subsequent personalisation thereof;
   a biometric trainer operable to train the stored universal background model with an additional voice sample provided by the user post enrolment that satisfies predefined adaptation criteria, wherein a first of the adaptation criteria comprises that the additional voice samples have been authenticated during a post enrolment authentication process referencing the user's voiceprint such that, once associated with the user, the stored universal background model is only trained with additional authenticated voice samples provided by the user so as to exclusively personalise the stored universal background model to the user and wherein a second of the adaptation criteria comprises that the additional voice samples meet a predefined quality measure and wherein the processing module is further operable to regenerate the voiceprint responsive to a change to the stored universal background model.

7. A voice authentication system in accordance with claim 6, wherein the voiceprint is regenerated utilising the additional voice sample.

8. A voice authentication system in accordance with claim 6, wherein the initially selected universal background model corresponds to a seed universal background model which is built from voice samples provided by a cohort of speakers with one or more shared voice characteristics.

9. A voice authentication system in accordance with claim 6, wherein the quality measure of the second adaptation criteria is met when an individual equal error rate for the additional voice samples is less than a predefined threshold.

10. A voice authentication system in accordance with claim 6, wherein the biometric trainer is operable to continue to train the stored universal background model with additional voice samples until a quality measure for at least one of the stored universal background model and voiceprint has been met.

11. Computer program code residing on a non-transitory medium comprising at least one instruction which, when executed by a computer, is arranged to implement a method for maintaining a voiceprint, comprising:

selecting a universal background model that matches one or more acoustic parameters determined for the user and storing the selected universal background model in a database in association with a user profile for subsequent personalisation thereof;

generating a voiceprint for the user utilising the stored universal background model associated with the user and at least one enrolment voice sample provided by the user;

training the stored universal background model with additional voice samples provided by the user post enrolment that satisfy predefined adaptation criteria, a first of the adaptation criteria comprises that the voice samples have been authenticated during a post enrolment authentication process referencing the user's voiceprint such that, once associated with the user, the stored universal background model is only trained with additional authenticated voice samples provided by the user so as to exclusively personalise the stored universal background model to the user and a second of the adaptation criteria comprising that the additional voice samples meet a predefined quality measure; and re-generating the voiceprint responsive to a change to the stored universal background model.

* * * * *